(12) United States Patent
Sasaki

(10) Patent No.: US 7,120,171 B2
(45) Date of Patent: Oct. 10, 2006

(54) PACKET DATA PROCESSING APPARATUS AND PACKET DATA PROCESSING METHOD

(75) Inventor: Takahiro Sasaki, Fukushima (JP)

(73) Assignee: Hitachi Telecom Technologies, Ltd., Tokyo (JP)

( * ) Notice: Subject to any disclaimer, the term of this patent is extended or adjusted under 35 U.S.C. 154(b) by 951 days.

(21) Appl. No.: 10/091,453

(22) Filed: Mar. 7, 2002

(65) Prior Publication Data

US 2002/0136205 A1      Sep. 26, 2002

(30) Foreign Application Priority Data

Mar. 7, 2001    (JP)  .............................. 2001-062733

(51) Int. Cl.
*H04J 3/06*        (2006.01)
(52) U.S. Cl. ....................... 370/517; 375/372
(58) Field of Classification Search ........... 370/395.64, 370/428, 235
See application file for complete search history.

(56) References Cited

U.S. PATENT DOCUMENTS

| | | | | |
|---|---|---|---|---|
| 5,226,012 | A * | 7/1993 | Amano et al. ......... | 365/189.05 |
| 5,594,868 | A * | 1/1997 | Nakagoshi et al. ......... | 709/234 |
| 6,754,179 | B1 * | 6/2004 | Lin ............................ | 370/235 |
| 6,813,275 | B1 * | 11/2004 | Sharma et al. .............. | 370/412 |
| 2003/0012197 | A1 * | 1/2003 | Yazaki et al. ............... | 370/392 |

\* cited by examiner

*Primary Examiner*—Chau Nguyen
*Assistant Examiner*—Christopher Grey
(74) *Attorney, Agent, or Firm*—Mattingly, Stanger, Malur & Brundidge, P.C.

(57)            ABSTRACT

In real time communication, long interruption of a media data signal caused by underflow or overflow of a buffer is reduced. A monitoring unit 35a monitors a state of the buffer 34 periodically. When the number of encoded data in the buffer 34 shows tendency of increasing from a standard data storage number, successively a predetermined number of times, then, it is judged that the buffer tends to overflow. And, the decoding unit 35 is made to skip at least one encoded data to be read and processed this time from the buffer 34. Further, when the number of encoded data in the buffer 34 shows tendency of decreasing from the mentioned standard data storage number, successively the predetermined number of times, then, it is judged that the buffer tends to underflow. And, the processing unit 35 is made to suspend operation during at least one period of the above-mentioned reproduction period.

7 Claims, 11 Drawing Sheets

PACKET DATA PROCESSING APPARATUS AND PACKET DATA PROCESSING METHOD

BACKGROUND OF THE INVENTION

The present invention relates to a technique of processing a packet data stream received through a packet-switched network, and particularly, to a technique suitable for real time reproduction processing of a packet data stream representing an audio signal or a video signal.

Recently, real time communication systems using a packet-switched network, such as VoIP (Voice over Internet Protocol), are proposed.

In this kind of real time communication system, in the transmitting end, a media data signal (i.e., an audio signal of, for example, talking voice, or a video signal of, for example, a dynamic image), which requires real time, is sampled at a sampling period, packeted, and transmitted onto a packet-switched network. Thus, the transmitting end transmits sequentially each of packet data constituting a packet data stream that represents the media data signal, onto the packet-switched network in accordance with the above-mentioned sampling period. Then, in the receiving end, each packet data constituting the above-mentioned packet data stream is received through the packet-switched network and processed in the order of reception, so that the media data signal represented by the packet data stream is reproduced.

In the meantime, when communication is performed through a packet-switched network, sometimes a packet data reception period deviates from a packet data transmission period, i.e., a sampling period of a media data signal in the transmitting end, owing to fluctuation of packet data transmission delay times (hereinafter, referred to as transmission fluctuation) on the packet-switched network. In that case, when the receiving end immediately processes packet data received from the packet-switched network, it is impossible to process continuously and sequentially the packet data, which constitute the packet data stream sent from the transmitting end, in accordance with the above-mentioned sampling period. As a result, there arises interruption or collapse of the media data signal.

FIG. 8 is a diagram for explaining a flow of a media data signal in the case where packet data received from a packet-switched network are processed immediately in the receiving end.

In the figure, the reference numeral 701 refers to an input signal as a media data signal inputted into a packet data transmitting apparatus, 702 to a reproduced signal as a media data signal outputted from a packet data receiving apparatus, 703 to a packet data stream transmitted from the packet data transmitting apparatus to a packet-switched network, and 704 to a packet data stream received by the packet data receiving apparatus through the packet-switched network. And, the reference numeral 705 refers to a sampling period $T_1$ for the packet data transmitting apparatus to generate the packet data stream 703 from the input signal 701, and 706 to a packet data transmission period $T_2$ for the packet data transmitting apparatus to transmit sequentially the packet data constituting the packet data stream 703 onto the packet-switched network. Generally, in the case of real time communication, the sampling period $T_1$ 705 coincides with the packet data transmission period $T_2$ 706. Further, the reference numeral 707 refers to a propagation delay time $T_3$ of a packet data on the packet-switched network.

Now, in FIG. 8, when respective propagation delay times $T_3$ 707 of a plurality of successive packet data are equal to each other, as in the case of the first and second packet data in the packet data stream 703, the packet data reception interval T between the plurality of successive packet data coincides with the packet data transmission period $T_2$ 706 of the packet data transmitting apparatus. In that case, at a point of time when reproduction processing on a certain packet data has been finished, the packet data receiving apparatus starts reproduction processing on a packet data to be reproduced next to the mentioned packet data. Thus, even when the packet data receiving apparatus processes the packet data immediately after reception from the packet-switched network, a reproduced signal can be obtained without causing interruption or collapse of the reproduced signal.

On the other hand, when transmission fluctuation arises with respect to at least one of a plurality of successive packet data as in the case of the second and third packet data in the packet data stream 703, and consequently, a packet data reception interval T in the mentioned plurality of successive packet data in the packet data receiving apparatus becomes longer than the packet data transmission period $T_2$ 706 of the packet data transmitting apparatus, then, sometimes there arises a situation where reproduction processing on a packet data to be reproduced next to a certain packet data is not started at a point of time when reproduction processing on the mentioned certain packet data has been finished. In that case, when the packet data receiving apparatus performs reproduction processing on packet data immediately after reception from the packet-switched network, there arises interruption between a reproduced signal obtained by reproduction of the certain packet data and a reproduced signal obtained by reproduction of the packet data to be reproduced next to that certain packet data.

Further, when there arises transmission fluctuation with respect to at least one of a plurality of successive packet data, as in the case of the third and fourth packet data in the packet data stream 703, and consequently, a packet data reception interval T in the mentioned plurality of successive packet data in the packet data receiving apparatus becomes shorter than the packet data transmission period $T_2$ 706 of the packet data transmitting apparatus, then, sometimes there arises a situation where reproduction processing on a packet data to be reproduced next to a certain packet data is started before the reproduction processing on the mentioned certain packet data is finished. In that case, when the packet data receiving apparatus performs reproduction processing on packet data immediately after reception from the packet-switched network, there arises collapse in a reproduced signal obtained by reproducing the certain packet data.

As described above, when a receiving end immediately processes packet data received from a packet-switched network, there arises interruption or collapse of a media data signal owing to transmission fluctuation. Thus, conventionally, the receiving end is provided with a buffer for absorbing transmission fluctuation, and packet data received from the packet-switched network are stored once into the buffer. Then, it is awaited that a predetermined number of packet data are stored in this buffer, and thereafter, the packet data are read sequentially from the buffer to subject them to reproduction processing. Such operation can reproduce the media data signal while preventing occurrence of interruption and collapse owing to transmission fluctuation.

FIG. 9 is a diagram for explaining a flow of a media data signal in the case where packet data received from a packet-switched network are stored once in a buffer and processed. Here, an element having the same function as in FIG. 8 has the same reference numeral.

In the figure, the reference numeral 704a refers to packet data stored in a buffer in the packet data receiving apparatus,

709 to a buffering waiting time $T_5$ extending from storing of the first packet data into the buffer to a start of reproduction processing on packet data, and 710 to a packet data reproduction period $T_4$.

Now, in FIG. 9, when the packet data receiving apparatus receives packet data through the packet-switched network, the packet data are stored once into the buffer. Then, it is awaited that the buffering waiting time $T_5$ 709 elapses. And, after the predetermined number of packet data (in this example, two packet data) are stored in this buffer, the packet data are read sequentially from the buffer in accordance with the packet data reproduction period $T_4$ 710 to perform reproduction processing. Accordingly, even when transmission fluctuation arises with respect to at least one of a plurality of successive packet data as in the case of the second and third packet data or the third and fourth packet data in the packet data stream 703, and consequently, a packet data reception interval T in the mentioned plurality of successive packet data in the packet data receiving apparatus becomes shorter or longer than the packet data transmission period $T_2$ 706 of the packet data transmitting apparatus, the reproduced signal can be obtained without causing interruption or collapse of the reproduced signal.

Here, in providing the receiving end with the buffer for absorbing transmission fluctuation, it is favorable to set the buffer size such that the maximum transmission fluctuation expected on the packet-switched network can be absorbed. However, sometimes, there arises transmission fluctuation exceeding the expected range, on the packet-switched network. When there arises transmission fluctuation that can not be absorbed by the buffer, buffer's underflow (a state in which the buffer is empty and a packet data to be processed next does not arrive at the buffer yet) or overflow (a state in which the buffer is full with packet data and still a packet data arrives one after the other) occurs. Thus conventionally, when buffer's underflow occurs, the reproduction processing on packet data is suspended until the predetermined number of packet data are stored in the buffer. When the predetermined number of packet data are stored in the buffer, then, the reproduction processing on packet data is resumed. When buffer's overflow occurs, the buffer is cleared, and the reproduction processing on packet data is suspended until the predetermined number of packet data are stored in the buffer. When the predetermined number of packet data are stored in the buffer, then, the reproduction processing on packet data is resumed.

FIG. 10 is a diagram for explaining processing in the case where underflow occurs in the buffer provided in the packet data receiving apparatus for absorbing transmission fluctuation, in the example of FIG. 9.

As shown in the figure, when transmission fluctuation exceeding the expected range arises with respect to at least one of a plurality of successive packet data as in the case of the 51st and 52nd packet data in the packet data stream 703, and consequently, a packet data reception interval T in the mentioned plurality of successive packet data in the packet data receiving apparatus becomes extremely longer than the packet data transmission period $T_2$ 706 of the packet data transmitting apparatus, then, sometimes there arises a situation (underflow) where, at a point of time when the reproduction processing on a certain packet data is finished, storing of a packet data that should be subjected to the reproduction processing next to the mentioned certain packet data has not stored into the buffer yet. In that case, the reproduction processing on packet data is suspended. Then, it is awaited that the buffering waiting time $T_5$ 709 elapses. After the predetermined number of packet data (in this example, two packet data) are stored in this buffer, the reproduction processing on packet data is resumed. As a result, there arises interruption of the buffering waiting time $T_5$ 709 in the reproduced signal. Here, the transmission fluctuation that can be absorbed is the larger, the longer the buffering waiting time $T_5$ 709 becomes.

FIG. 11 is a diagram for explaining processing in the case where overflow occurs in the buffer provided in the packet data receiving apparatus for absorbing transmission fluctuation, in the example of FIG. 9.

As shown in the figure, when transmission fluctuation exceeding the expected range arises with respect to at least one of a plurality of successive packet data as in the case of 71st and 72nd packet data in the packet data stream 703, and consequently, a packet data reception interval T in the mentioned two successive packet data becomes extremely shorter than the packet data transmission period $T_2$ 706 of the packet data transmitting apparatus, then, sometimes there arises a situation (overflow) where, a new packet data arrives at the buffer even though the buffer is full with packet data, in the packet data receiving apparatus. In that case, the buffer is reset once (clearing of the inside of the buffer). Then, it is awaited that the buffering waiting time $T_5$ 709 elapses. After the predetermined number of packet data (in this example, two packet data) are stored in this buffer, the reproduction processing on packet data is resumed. As a result, there arises interruption of the buffering waiting time $T_5$ 709 in the reproduced signal. Here, the transmission fluctuation that can be absorbed is the larger, the longer the buffering waiting time $T_5$ 709 becomes.

As described above, conventionally, a receiving end is provided with a buffer for absorbing transmission fluctuation, and packet data received from a packet-switched network are stored once in this buffer. Then, the packet data are read sequentially from the buffer in accordance with a sampling period, and processed.

Here, conventionally, a precision error between a clock generator (which generates a clock used for generating a packet data stream from an inputted media data signal) in a transmitting end and a clock generator (which generates a clock used for reading packets sequentially from a buffer to perform reproduction processing) in a receiving end is not taken into consideration. An error between those clocks causes difference between a sampling period $T_1$ 705 (a packet data transmission period $T_2$ 706) in the transmitting end and a packet data reproduction period $T_4$ 710. Accordingly, the number of packet data stored in the buffer increases or decreases, finally causing underflow or overflow of the buffer.

Conventionally, buffer underflow and overflow generated by such a cause also have been processed similarly to the buffer underflow and overflow generated by transmission fluctuation exceeding an expected range. As described above, the transmission fluctuation that can be absorbed by the buffer is the larger, the longer the suspension time (which is equal to the buffering waiting time $T_5$ 709) of the reproduction processing on packet data in the case of buffer underflow or overflow becomes. Such long interruption of the reproduced signal deteriorates the quality of real time communication.

SUMMARY OF THE INVENTION

The present invention has been made taking the above-described conditions into consideration. And, an object of the present invention is to reduce long interruption of a media data signal caused by underflow or overflow of a buffer, in real time communication.

In detail, an object of the present invention is to prevent buffer underflow and overflow caused by an error between a clock period of a clock used for generating a packet data stream from a media data signal and a clock period of a clock used for processing the packet data stream to reproduce the media data signal.

To attain the above object, the present invention provides a packet data processing apparatus comprises: a network interface unit for receiving packet data constituting a packet data stream from a packet-switched network; a buffer for temporarily storing packet data received by the network interface unit; a processing unit for sequentially reading and processing the packet data stored in the buffer; and a monitoring unit for monitoring a state of the buffer periodically.

Here, the monitoring unit makes said processing unit skip at least one data of a packet data to be read and processed next by said processing unit, in the case where a number of the data of the packet data stored in said buffer shows a tendency of increasing from a predetermined number of data, successively a given number of times; and makes said processing unit suspend operation during a period of time required for reading and processing at least one packet data, in the case where the number of the data of the packet data stored in said buffer shows a tendency of decreasing from the predetermined number of data, successively the given number of times.

Generally, transmission fluctuation is temporary, and increase or decrease of the packet data in the buffer owing to transmission fluctuation has no tendency from the long-term viewpoint.

On the other hand, increase or decrease of the packet data in the buffer owing to an error between the clock period of a clock used for generating a packet data stream from a media data signal and the clock period of a clock used for processing the packet data stream to reproduce the media data signal has a certain tendency from the long-term viewpoint.

For example, when the reproduction period of a media data signal is shorter than the sampling period of the media data signal, then, the number of packet data in the above-mentioned buffer tends to underflow from the long-term viewpoint. On the other hand, when the above-mentioned reproduction period is longer than the above-mentioned sampling period, then, the number of packet data in the buffer tends to overflow from the long-term viewpoint.

Thus, in the packet data processing apparatus of the present invention, the above-mentioned monitoring unit monitors the state of the buffer periodically.

Then, when the number of packet data in the buffer tends to increase from a predetermined number of data, successively a given number of times, then, it is judged that there is a tendency of overflow owing to a difference between the sampling period and the reproduction period. Thus, the above-mentioned processing unit is made to skip at least one data of a packet data to be read and processed next from the buffer. Further, when the number of packet data in the buffer tends to decrease from the predetermined number of data, successively the given number of times, then, it is judged that there is a tendency of underflow owing to a difference between the sampling period and the reproduction period. Thus, the above-mentioned processing unit is made to suspend operation during a time required for reading and processing at least one packet data.

Thus, according to the present invention, it is possible to prevent underflow and overflow of the buffer owing to a difference between the sampling period and the reproduction period. Accordingly, it is possible to reduce frequency of long interruption (extending over a buffering waiting time) of a media data signal, caused by underflow or overflow of the buffer.

DETAILED DESCRIPTION OF THE PREFERRED EMBODIMENTS

Now, embodiments of the present invention will be described.

Figure 1:
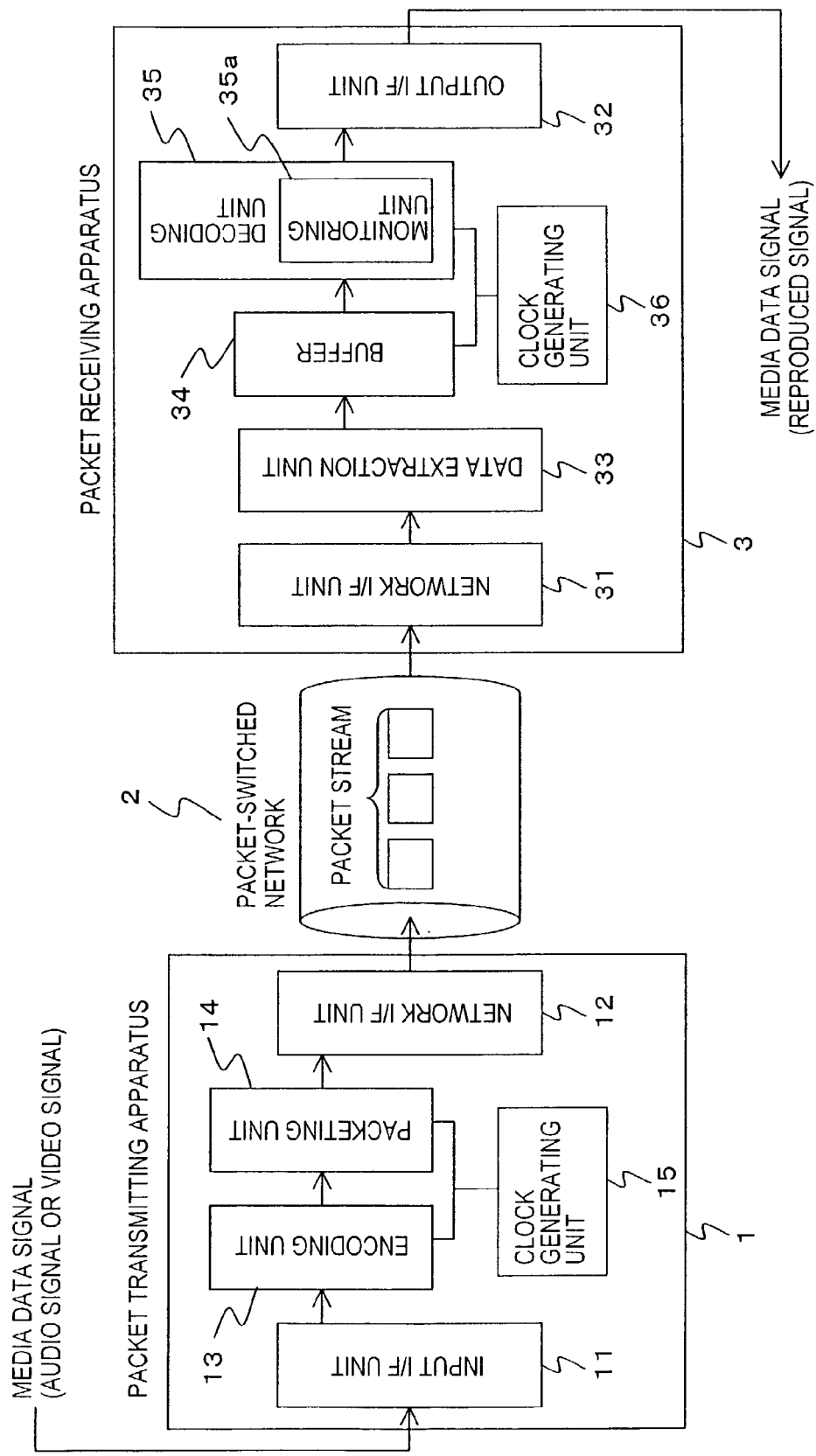
FIG. 1 is a schematic block diagram showing a real time communication system using a packet data receiving apparatus to which one embodiment of the present invention is applied.

FIG. 1 shows a configuration of a real time communication system using a packet data receiving apparatus to which one embodiment of the present invention is applied.

In the figure, the reference numeral refers to a packet data transmitting apparatus, 2 to a packet-switched network such as an IP (Internet Protocol) network, and 3 to the packet data receiving apparatus to which one embodiment of the present invention is applied.

In the packet data transmitting apparatus 1, a media data signal such as a video signal obtained by a video camera or an audio signal obtained by a microphone is inputted into an encoding unit 13 through an input interface (I/F) unit 11. The encoding unit 13 samples the media data signal delivered from the input I/F unit 11 in accordance with a sampling period specified by a reference clock signal supplied from a clock generating unit 15, to encode the media data signal, and delivers the encoded data to a packeting unit 14.

The packeting unit 14 stores the encoded data into a payload and stores the address of the packet data receiving apparatus 3 into a header, to generate packet data. Then, the generated packet data are transmitted onto the packet-switched network through a network I/F unit 12 in accordance with the above-mentioned sampling period.

By this, the packet data transmitting apparatus 1 sequentially transmits the packet data constituting a packet data stream that represents the media data signal, onto the packet-switched network 2, in accordance with the sampling period (the packet data transmission period) determined by the above-mentioned reference clock signal.

On the other hand, in the packet data receiving apparatus 3, a network I/F unit 31 receives the packet data addressed to the packet data receiving apparatus 3 from the packet-switched network 2, and delivers the received packet data to a data extraction unit 33. The data extraction unit 33 extracts the encoded data from the payloads of the packet data received from the network I/F unit 31, and stores the extracted encoded data into a buffer 34.

Here, as the buffer 34, may be used a dual port RAM, for example. Assuming that the storage address of the encoded data stored last time is N, the buffer 34 this time stores the encoded data at the storage address N+1. When the storage address N is the maximum address value, then, the encoded data to be stored this time is stored at the storage address 1. Further, assuming that the storage address of the encoded data read last time is M, the buffer 34 this time reads encoded data from the storage address M+1. When the storage address M is the maximum address value, then, the storage address of the encoded data read this time is 1. Thus, the buffer 34 is used ring-wise.

A decoding unit 35 sequentially reads the encoded data from the buffer 34 in accordance with a reproduction period determined by a reference clock signal (which has ideally the same clock period as the reference clock signal outputted by the clock generating unit 15) supplied from a clock generating unit 36, to decode the data. Then, the decoded data is outputted through an output I/F unit 32.

Thus, the packet data receiving apparatus 3 reproduces the media data signal from the packet data stream received from the packet data transmitting apparatus 1 through the packet-switched network 2.

Now, as described above, the clock period of the reference clock signal outputted from the clock generating unit 36 is ideally same as the clock period of the reference clock signal outputted from the clock generating unit 15. In fact, however, there is a difference between them owing to a precision error etc. Thus, there is a difference between the sampling period of the packet data transmitting apparatus 1 and the reproduction period of the packet data receiving apparatus 2. Accordingly, even when transmission fluctuation does not occur in the packet-switched network 2, there arises a difference between the number of data stored in the buffer 34 for a certain period of time and the number of data read from the buffer 34 for the mentioned certain period of time. This difference in the number of data accumulates in course of time, and causes underflow or overflow of the buffer 34.

Thus, in the present embodiment, a monitoring unit 35a is provided in the decoding unit 35. This monitoring unit 35a is used to perform synchronization processing such as control of an address of data read from the buffer 34, in order to prevent underflow and overflow of the buffer 34 caused by a clock error between the packet data transmitting apparatus 1 and the packet data receiving apparatus 3.

Figure 2:
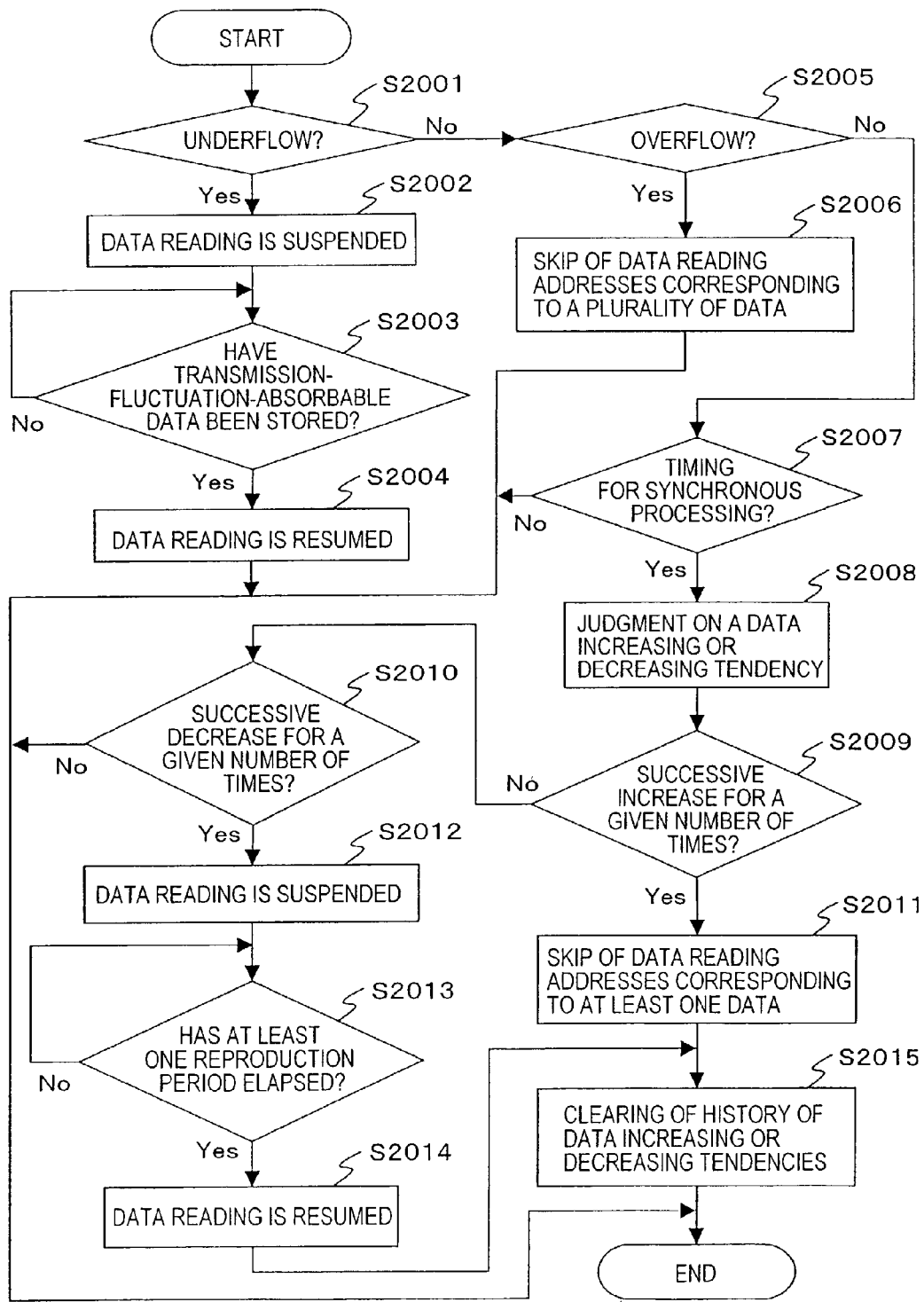
FIG. 2 is a flowchart for explaining operation of the monitoring unit 35a in the packet data receiving apparatus 3 shown in FIG. 1.

FIG. 2 shows an operation flow in the monitoring unit 35a. This flow is executed synchronously with the reproduction period of the packet data receiving apparatus 2.

First, the monitoring unit 35a judges if the buffer 34 underflows or not (S2001). This can be judged in the following way, assuming that the decoding unit 35 this time reads encoded data from the storage address N.

Namely, the decoding unit 35 reads encoded data from the address N, and thereafter judges if new encoded data has been written at the address N by the data extraction unit 33. When new data has been written, then, it means that encoded data to be read this time is stored at the storage address N, and thus, it is judged that the buffer does not underflow. On the other hand, when new data has not been written, it means that encoded data to be read this time has not been stored yet at the storage address N, and thus, it is judged that the buffer underflows.

When, it is judged in the step S2001 that the buffer underflows, then, the decoding unit 35 is made to suspend reading of encoded data from the buffer 34 (S2002). Then, it is awaited that the data extraction unit 33 stores new encoded data to a standard data storage number in the buffer 34 (the standard data storage number is the number of data required for absorbing expected transmission fluctuation) (S2003), and then the decoding unit 35 is made to resume reading of encoded data from the buffer 34 (S2004).

On the other hand, when it is judged in the step S2001 that the buffer does not underflow, then the monitoring unit 35a judges if the buffer 34 overflows (S2005). This can be judged in the following way, assuming that the decoding unit 35 this time reads encoded data from the storage address N.

Namely, the decoding unit 35 reads encoded data from the address N, and thereafter judges if the data extraction unit 23 has written new encoded data twice at the address N. When new encoded data have been written twice, it means that encoded data to be read this time has not been read and updated to encoded data to be read next time, and thus it is judged that the buffer overflows. On the other hand, when new encoded data have not been written twice, it means that encoded data to be read this time is stored at the storage address N, and thus it is judged that the buffer does not overflow.

When it is judged in S2005 that the buffer overflows, then, the decoding unit 35 is made to skip the storage address of the encoded data to be read this time, by the above-mentioned standard data storage number−1 (S2006). For example, when the above-mentioned standard data storage number is n and the storage address of the encoded data to be read by the decoding unit 35 this time is N, then the storage address of the encoded data to be read by the decoding unit 35 this time is set to N+n−1.

Now, when it is judged in S2005 that the buffer does not overflow, then, in the case that it is a time for synchronous processing (S2007), the monitoring unit 35a performs the following synchronous processing (S2008–S2016) in order to prevent overflow and underflow of the buffer 34 owing to a clock error between the packet data transmitting apparatus 1 and the packet data receiving apparatus 3.

Here, in the present embodiment, it is assumed that the period of the synchronous processing is several times as long as the reproduction period determined by the reference clock signal outputted from the clock generating unit 36.

First, at a point of time when the decoding unit 35 reads encoded data from the buffer 34, the monitoring unit 35a examines a storing state of encoded data that follows the encoded data concerned as the object of the reading by the above-mentioned standard data storage number−1, and storing states of the following encoded data, in the buffer 34. By this, the monitoring unit 35a judges an increasing or decreasing tendency in the number of data stored in the buffer 34 in comparison with the above-mentioned standard data storage number (S2008).

For example, it is assumed that the above-mentioned standard data storage number is n. Further it is assumed that the storage address of the encoded data as the object of reading is N. Then, when, at a point of time when reading of this encoded data is started, writing of encoded data to the storage address N+n−1 has not been finished yet, then it is judged that the number of stored data tends to decrease. On the other hand, in the case where writing of encoded data to the storage address N+n−1 has been finished already and further writing of encoded data to the storage address N+n has been finished also, then it is judged that the number of stored data tends to increase. And, in the case that is different from both cases, namely, the case where writing of encoded data to the storage address N+n−1 has been finished while writing of encoded data to the storage address N+n has not been finished, it is judged that the number of encoded data stored has neither an increasing tendency nor a decreasing tendency.

Next, when a predetermined number of successive judgment results of S2008, which include the judgment result of S2008 for this time, show the increasing tendency in the number of encoded data stored, then, the processing moves to the step S2011. And, when the predetermined number of successive judgment results show the decreasing tendency in the number of encoded data stored, then, the processing moves to the step S2012 (S2009, S2010).

As described above, generally speaking, transmission fluctuation is temporary, and increasing or decreasing of packet data in the buffer 34 owing to transmission fluctuation has no tendency from the long-term viewpoint. However, from the short-term viewpoint, sometimes it is seen that increasing or decreasing in the number of data in the buffer 34 has a certain tendency. Thus, when the above-mentioned predetermined number is smaller, it becomes impossible to judge if an increasing or decreasing tendency in the number of encoded data stored in the buffer 34 is caused by a clock error between the packet data transmitting apparatus 1 and the packet data receiving apparatus 3 or caused by transmission fluctuation occurred in the packet-switched network 2.

Thus, the above-mentioned predetermined number is set so as to obtain a sufficient time (=the reproduction period× the above-mentioned predetermined number) for judging if an increasing or decreasing tendency in the number of data stored in the buffer 34 is caused by a clock error between the packet data transmitting apparatus 1 and the packet data receiving apparatus 3 or caused by transmission fluctuation occurred in the packet-switched network 2.

Here, whether the predetermined number of successive judgment results of S2008 show an increasing tendency or decreasing tendency in the number of stored data can be judged in the following way, for example.

Namely, the monitoring unit 35a is provided with a data increase counter and a data decrease counter. When a judgment result of S2008 shows an increasing tendency in the number of stored data, then, the count value of the data increase counter is incremented by one, and the data decrease counter is reset. On the other hand, when a judgment result of S2008 shows a decreasing tendency in the number of stored data, then, the count value of the data decrease counter is incremented by one, and the data increase counter is reset. Further, when a judgment result of S2008 shows neither an increasing tendency nor a decreasing tendency in the number of stored data, both of the data increase counter and the data decrease counter are reset.

Next, the monitoring unit 35a is made to examine the count values of the data increase counter and the data decrease counter. When the count value of the data increase counter arrives at the predetermined value, then it is judged that the predetermined number of successive judgment results of S2008 show an increasing tendency in the number of encoded data stored. On the other hand, when the count value of the data decrease counter arrives at the predetermined value, then it is judged that the predetermined number of successive judgment results of S2008 show a decreasing tendency in the number of encoded data stored.

Now, in S2011, the monitoring unit 35a makes the decoding unit 35 skip the storage address of the encoded data to be read this time from the buffer 34, by at least the number corresponding to one data (however, at least less than or equal to the number of skips in S2006). For example, assuming that the storage address of the encoded data to be read this time by the decoding unit 35 is N, the storage address of the encoded data to be read this time is set to N+n' (here, n'≦n−1, and n is the above-mentioned standard data storage number).

On the other hand, in S2012, the monitoring unit 35a makes the decoding unit 35 suspend reading of encoded data from the buffer 34. Then, awaiting the elapse of at least one period of the reproduction period determined by the reference clock signal outputted from the clock generating unit 36 (however, the elapse of at least shorter than the waiting time in S2003) (S2013), the monitoring unit 35a makes the decoding unit 35 resume reading of encoded data from the buffer 34 (S2014).

Finally, when the monitoring unit 35a executes the processing of S2011 or of S2012–S2014, the monitoring unit 35a clears a history of the judgment results in S2008 (i.e., a history of increasing and decreasing tendencies in the data storage number) held by the monitoring unit 35a itself (S2015). When the monitoring unit 35a is provided with the above-mentioned data increase counter and data decrease counter, both counters are reset.

Next, a flow of a media data signal in the real time communication system shown in FIG. 1 will be described.

First, will be described a flow of a media data signal in the case where the reproduction period of the packet data receiving apparatus 3 is shorter than the sampling period (the packet data transmission period) of the packet data transmitting apparatus 1.

Figure 4:
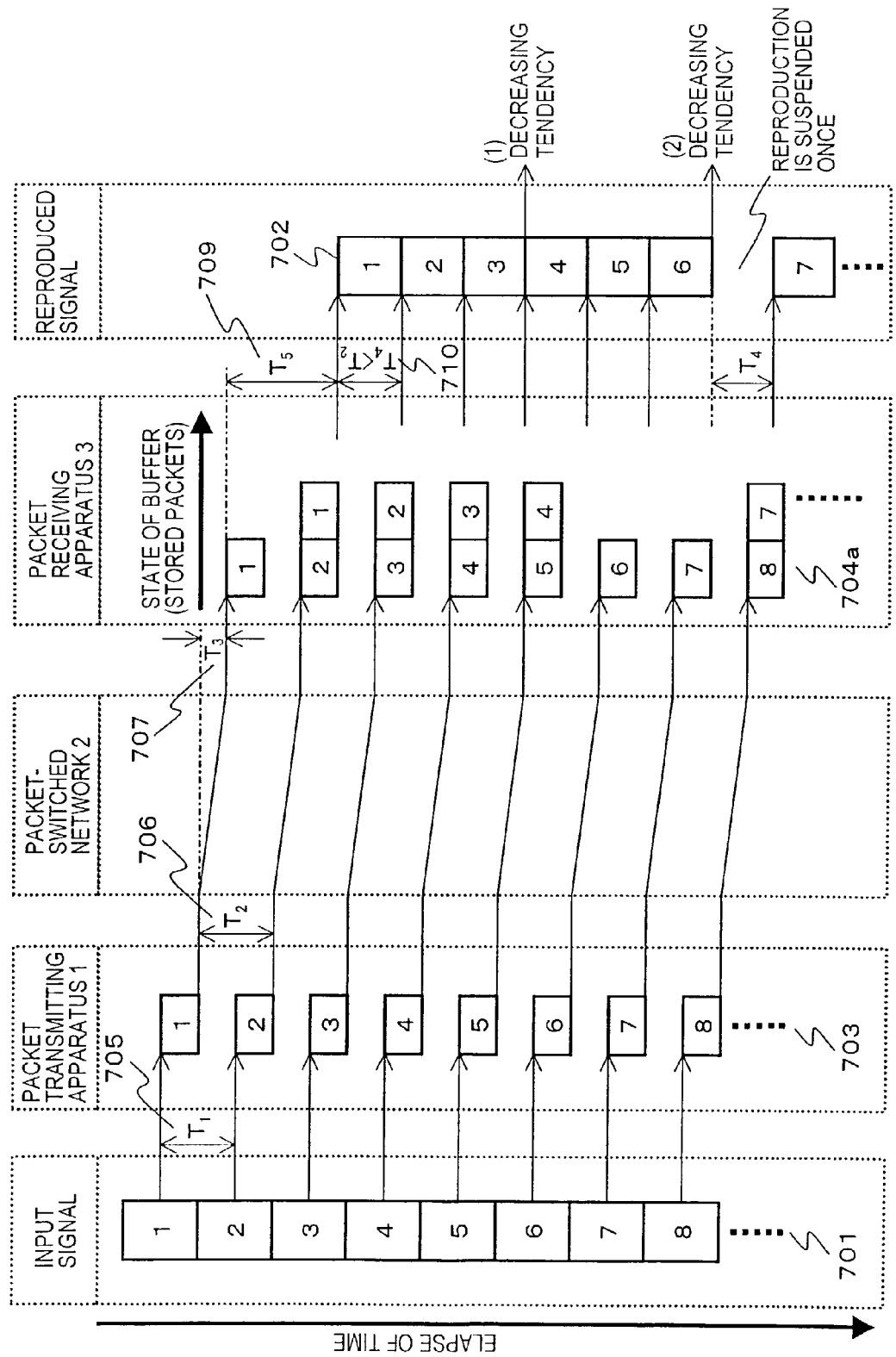
FIG. 4 is a diagram for explaining a flow of a media data signal in the case where the reproduction period of the packet data receiving apparatus 3 is shorter than the sampling period (the packet data transmission period) of the packet data transmitting apparatus 1 in the real time communication system shown in FIG. 1.

FIG. 4 is a diagram for explaining a flow of a media data signal in the case where the reproduction period of the packet data receiving apparatus 3 is shorter than the sampling period (the packet data transmission period) of the packet data transmitting apparatus 1 in the real time communication system shown in FIG. 1.

Here, for the sake of simplicity of description, it is assumed that transmission fluctuation does not occur on the packet-switched network 2. Further, it is assumed that the standard data storage number in the buffer 34 is 2, the period of the synchronous processing is three times as long as the reproduction period $T_4$ 710, and the predetermined time in S2009 and S2010 of FIG. 2 is 2. Further, an element having the same function as in FIGS. 8–11 has the same reference numeral.

Now, in FIG. 4, when the packet data receiving apparatus 3 receives a packet data through the packet-switched network 2, then the packet data receiving apparatus 3 extracts encoded data from the packet data and stores the extracted data into the buffer 34 once. Then, awaiting the elapse of the buffering waiting time $T_5$ 709, the reproduction processing is started up. Namely, at a point of time when the standard data storage number of encoded data (here, two encoded data) have been stored in the buffer 34, the reproduction processing is started up. Thereafter, the encoded data are read sequentially from the buffer 34 in accordance with the reproduction period $T_4$ 710 to perform the reproduction processing.

Here, as described above, when there comes a point of the synchronous processing (a point having the period of three, times the reproduction period $T_4$ 710, or in other words, a point of 4k-th (k: a natural number) reproduction processing), then, assuming that the decoding unit 35 is to process this time the encoded data at the storage address N, the monitoring unit 35a examines whether writing of encoded data into the storage address N+2−1 has been finished already or not, at a point of time when reading of the mentioned encoded data at the address N is started.

In the example shown in FIG. 4, it is assumed that the reproduction period $T_4$ 710 of the packet data receiving apparatus 3 is shorter than the sampling period $T_1$ 705 (the packet data transmission period $T_2$ 706) of the packet data transmitting apparatus 1, and transmission fluctuation does not occur. At the point of the first synchronous processing, writing of the encoded data of the fifth packet data (which comes after a (2−1) packet data from the encoded data of the fourth packet data to be processed next by the decoding unit 35) has not been finished. Thus, the monitoring unit 35a judges that the number of stored data tends to decrease. Further, also at the point of the second synchronous processing, writing of the encoded data of the eighth packet data (which comes after a (2−1) packet data from the encoded data of the seventh packet data to be processed next by the decoding unit 35) has not been finished, and the monitoring unit 35a judges that the number of stored data tends to decrease. Thus, it is judged two times successively that the number of stored data tends to decrease, and accordingly the monitoring unit 35a makes the decoding unit 35 suspend reading of encoded data from the buffer 34. Then, awaiting the elapse of at least one period of the reproduction period $T_4$ 710 (here, just one period of the reproduction period $T_4$ 710), the monitoring unit 35a makes the decoding unit 35 resume reading of encoded data from the buffer 34.

Next, will be described a flow of a media data signal in the case where the reproduction period of the packet data receiving apparatus 3 is longer than the sampling period (the packet data transmission period) of the packet data transmitting apparatus 1.

Figure 5:
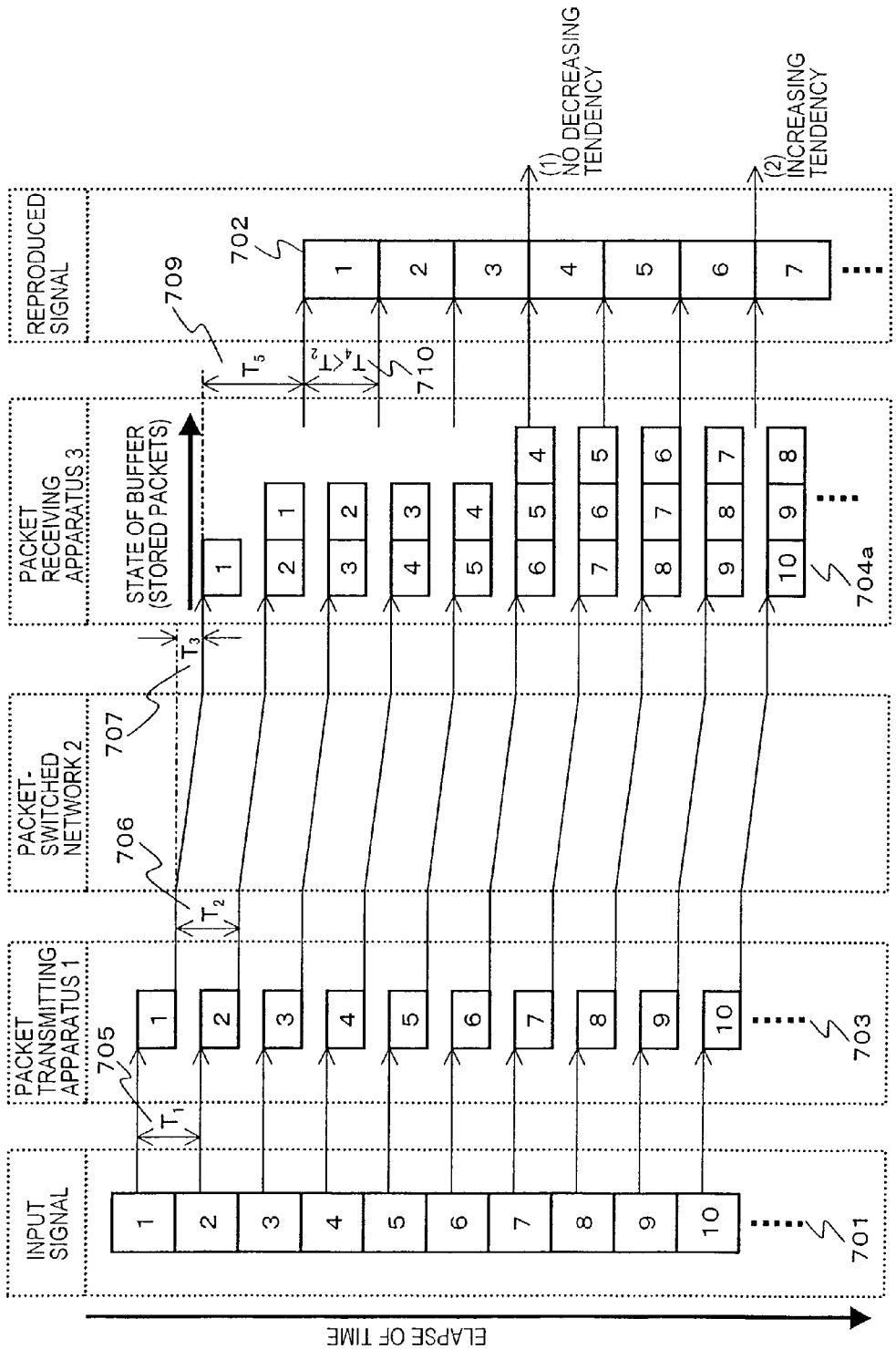
FIG. 5 is a diagram for explaining a flow of a media data signal in the case where the reproduction period of the packet data receiving apparatus 3 is longer then the sampling period (the packet data transmission period) of the packet data transmitting apparatus 1 in the real time communication system shown in FIG. 1.
Figure 6:
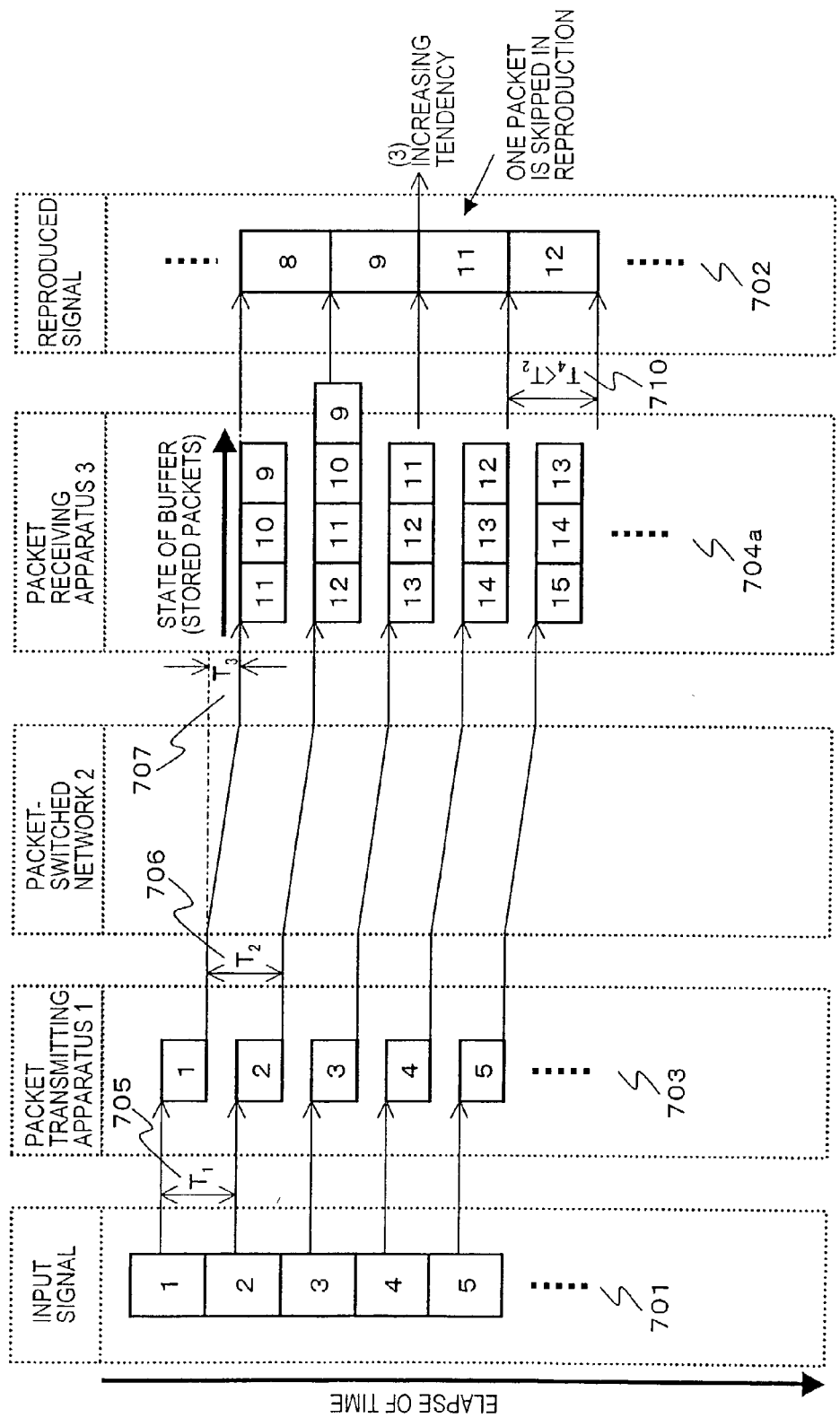
FIG. 6 is a diagram for explaining a flow of a media data signal in the case where the reproduction period of the packet data receiving apparatus 3 is longer than the sampling period (the packet data transmission period) of the packet data transmitting apparatus 1 in the real time communication system shown in FIG. 1.

FIGS. 5 and 6 are diagrams for explaining a flow of media data signal in the case where the reproduction period of the packet data receiving apparatus 3 is longer than the sampling period (the packet data transmission period) of the packet data transmitting apparatus 1 in the real time communication system shown in FIG. 1.

Here, as in FIG. 4, it is assumed that transmission fluctuation does not occur on the packet-switched network 2. Further, the same conditions as in FIG. 4 are assumed with respect to the standard data storage number of the buffer 34, the period of the synchronous processing, and the predetermined number in the steps S2009 and 2010 of FIG. 2.

As described above, when there comes a point of the synchronous processing, then, assuming that the decoding unit 35 is to process this time the encoded data at the storage address N, the monitoring unit 35a examines whether writing of encoded data into the storage address N+2 has been finished already, at a point of time when reading of the mentioned encoded data t the address N is started.

In the example shown in FIGS. 5 and 6, it is assumed that the reproduction period $T_4$ 710 of the packet receiving apparatus 3 is longer than the sampling period $T_1$ 705 (the packet transmission period $T_2$ 706) of the packet transmitting apparatus 1, and transmission fluctuation does not occur. At the point of the first synchronous processing, writing of the encoded data of the sixth packet (which comes after two packet data from the encoded data of the fourth packet data to be processed this time by the decoding unit 35) has not been finished. Thus, the monitoring unit 35a judges that there is no tendency of increasing or decreasing in the number of stored data. However, at the point of the second synchronous processing, writing of the encoded data of the ninth packet data (which comes after two packet data from the encoded data of the seventh packet data to be processed this time by the decoding unit 35) has been finished. Thus, the monitoring unit 35a judges that the number of stored data tends to increase. Further, also at the point of the third synchronous processing, writing of the encoded data of the twelfth packet data (which comes after two packet data from the encoded data of the tenth packet data to be processed this time by the decoding unit 35) has been finished. Thus, the monitoring unit 35a judges that the number of stored data tends to increase. Thus, it is judged twice successively that the number of stored data tends to increase, and accordingly, the monitoring unit 35a makes the decoding unit 35 skip the storage address of the encoded data to be read from the buffer 34 and processed this time, by the number corresponding to one data. Namely, the encoded data of the eleventh packet data is set as the data of the processing object.

Next, will be described a flow of a media data signal in the case where transmission fluctuation exceeding the expected range occurs on the packet-switched network and accordingly the buffer 34 underflows or overflows.

Figure 10:
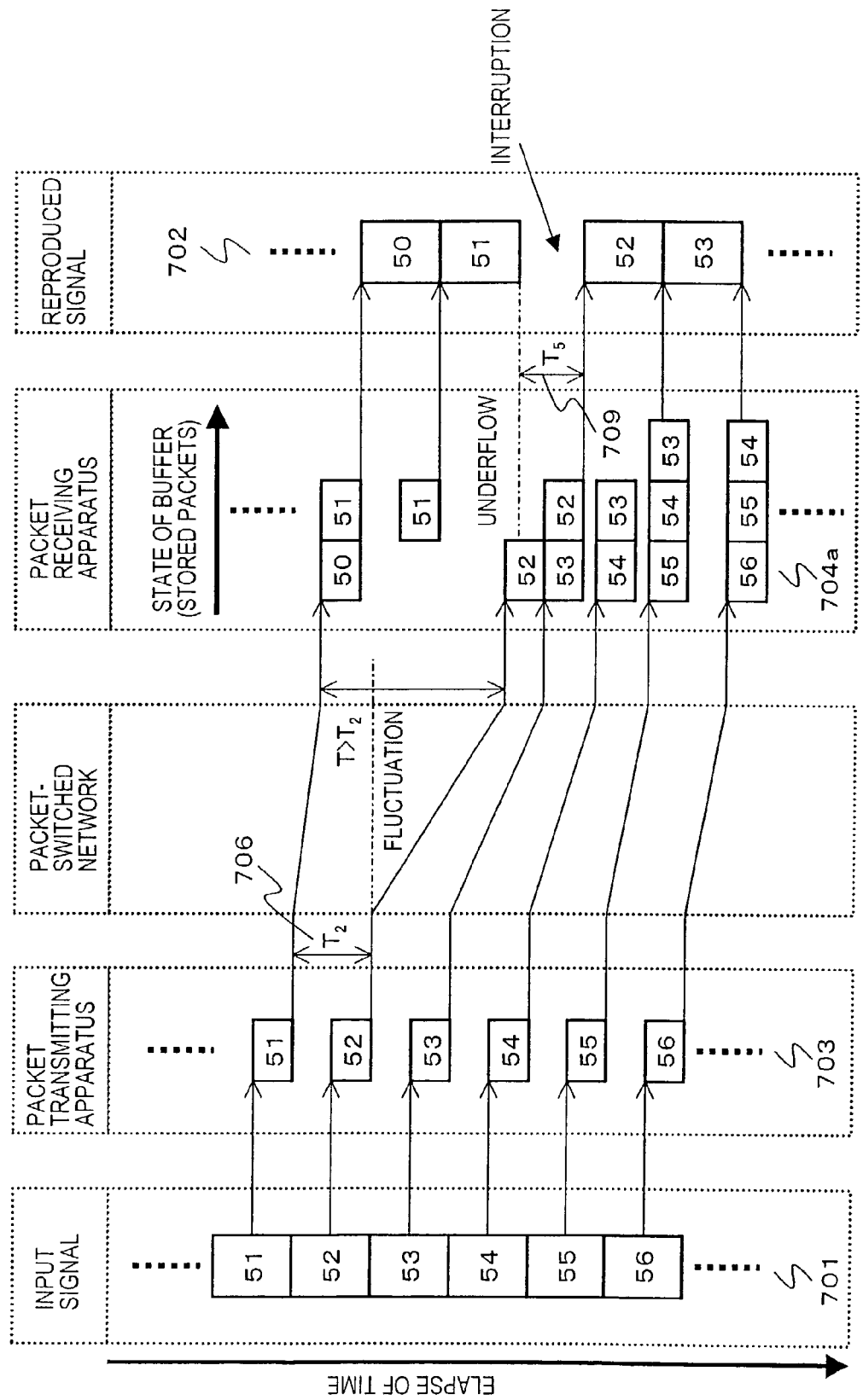
FIG. 10 is a diagram for explaining processing in the case where underflow occurs in the buffer provided in the packet data receiving apparatus for absorbing transmission fluctuation, in the example of FIG. 9.
Figure 11:
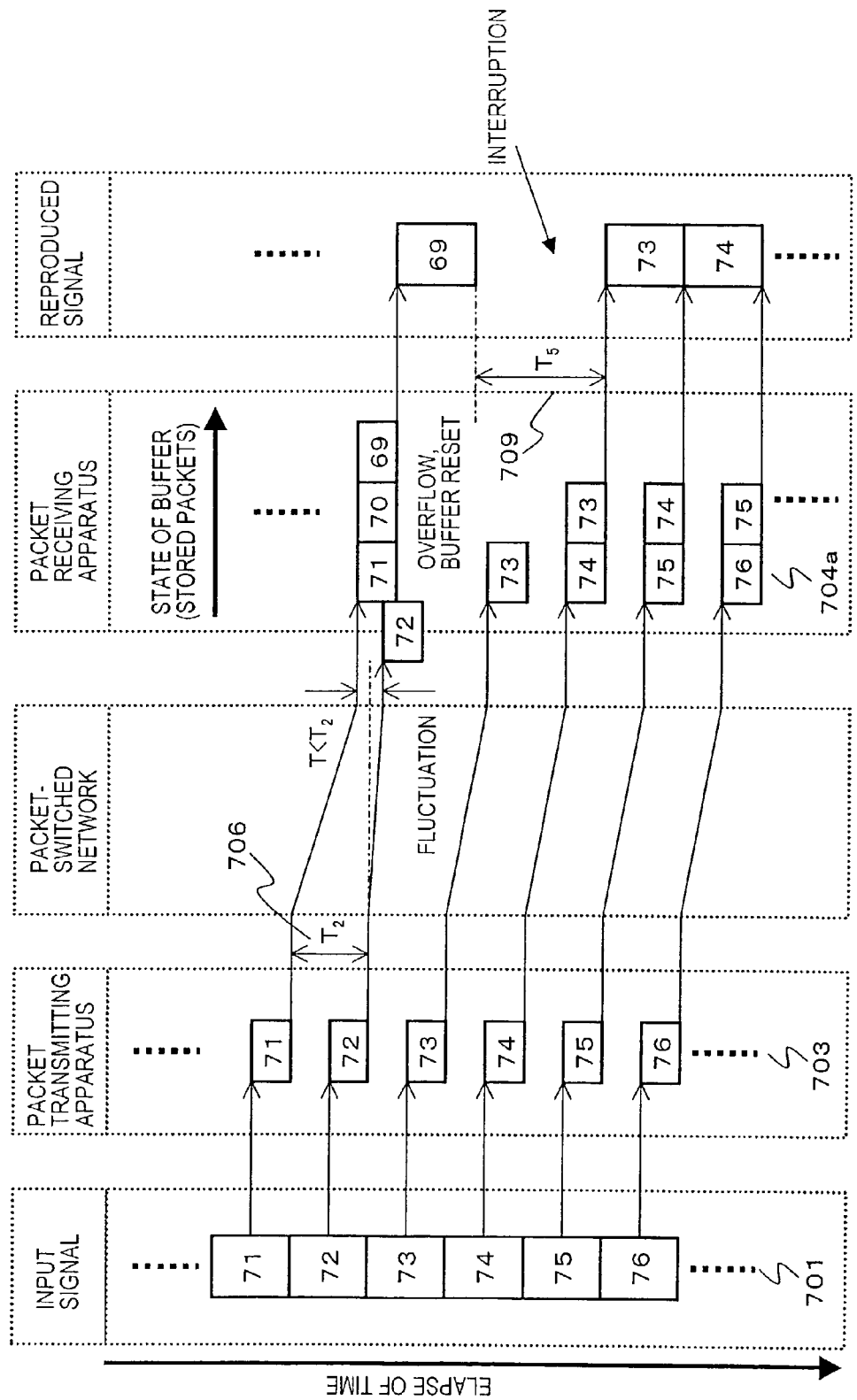
FIG. 11 is a diagram for explaining processing in the case where overflow occurs in the buffer provided in the packet data receiving apparatus for absorbing transmission fluctuation, in the example of FIG. 9.

When the buffer 34 underflows, the flow is similar to the one of the media data signal shown in FIG. 10. Namely, the monitoring unit 35a makes the decoding unit 35 suspend reading of encoded data from the buffer 34. Then, awaiting that the above-mentioned standard data storage number of encoded data (here, two encoded data) have been stored in the buffer 34, the reading of the encoded data is resumed. As a result, there occurs interruption where the media data signal is not reproduced during the buffering waiting time $T_5$ 709. Here, the standard data storage number is the larger, i.e., the transmission fluctuation that can be absorbed is the larger, the longer the buffering waiting time $T_5$ 709 becomes.

Figure 7:
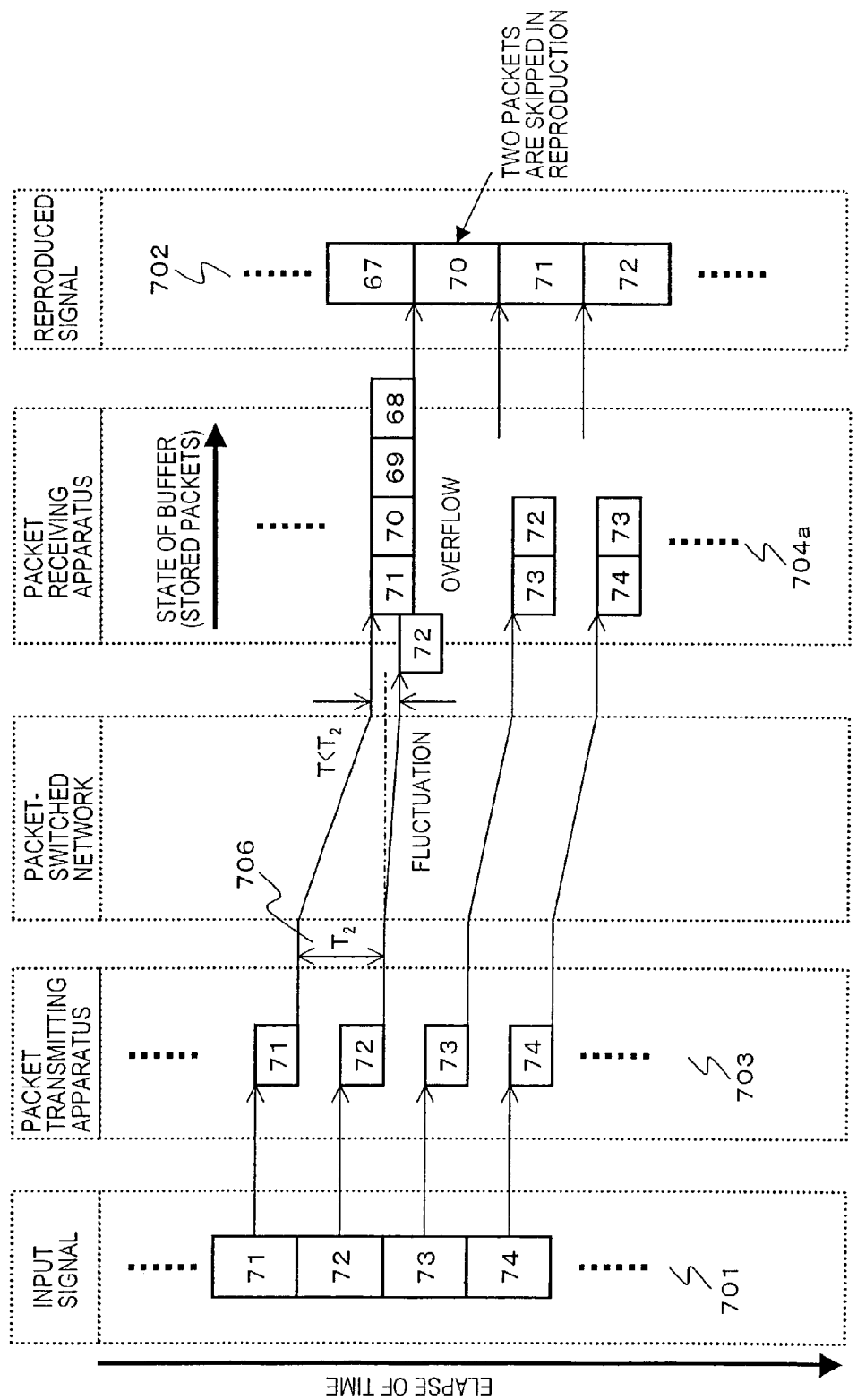
FIG. 7 is a diagram for explaining a flow of a media data signal in the case where the transmission fluctuation exceeding an expected range arises on the packet-switched network 2 and the buffer 34 overflows, in the real time communication system shown in FIG. 1.
Figure 8:
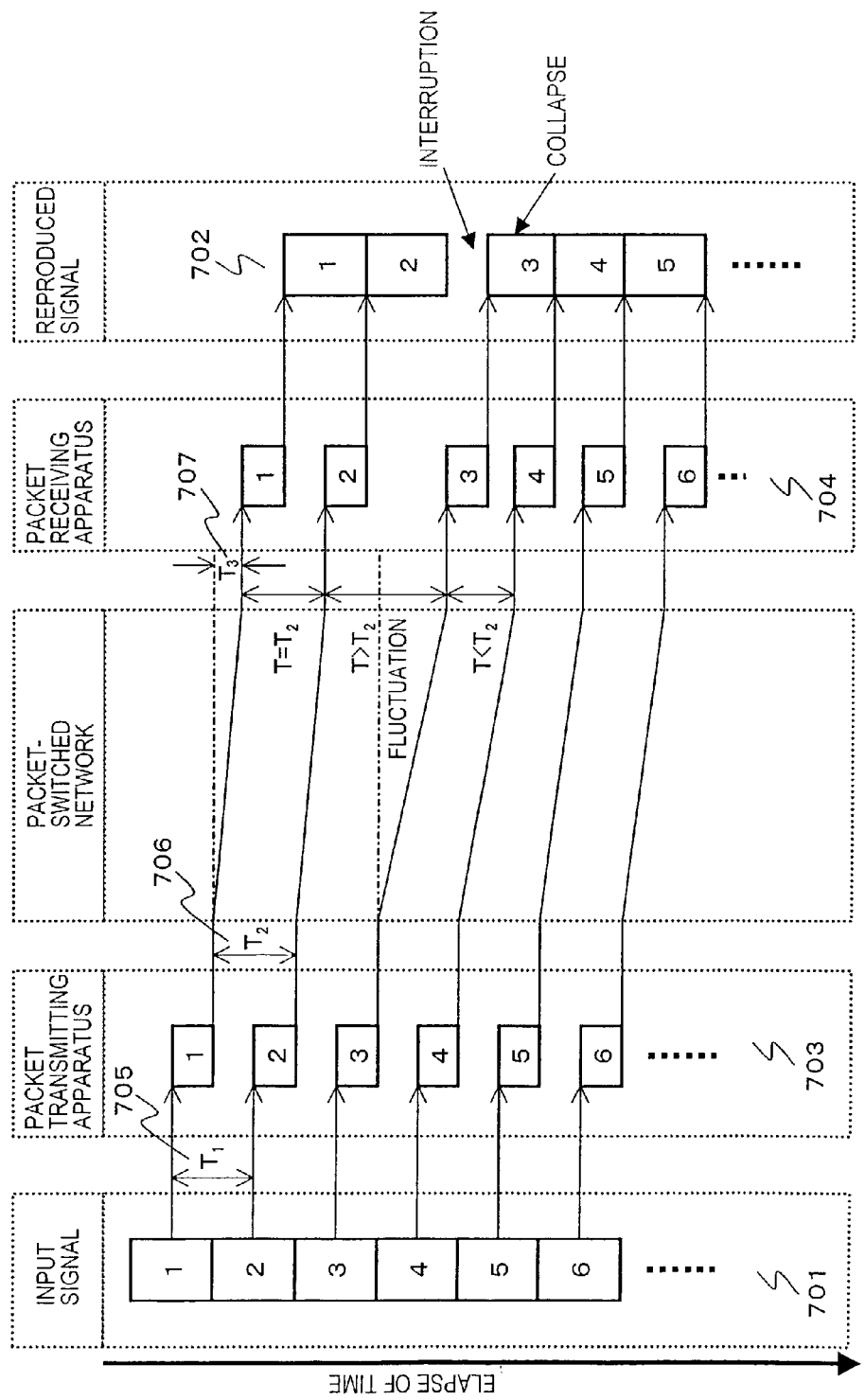
FIG. 8 is a diagram for explaining a flow of a media data signal in the case where a receiving end immediately processes a packet data received from a packet-switched network, in the conventional real time communication system.
Figure 9:
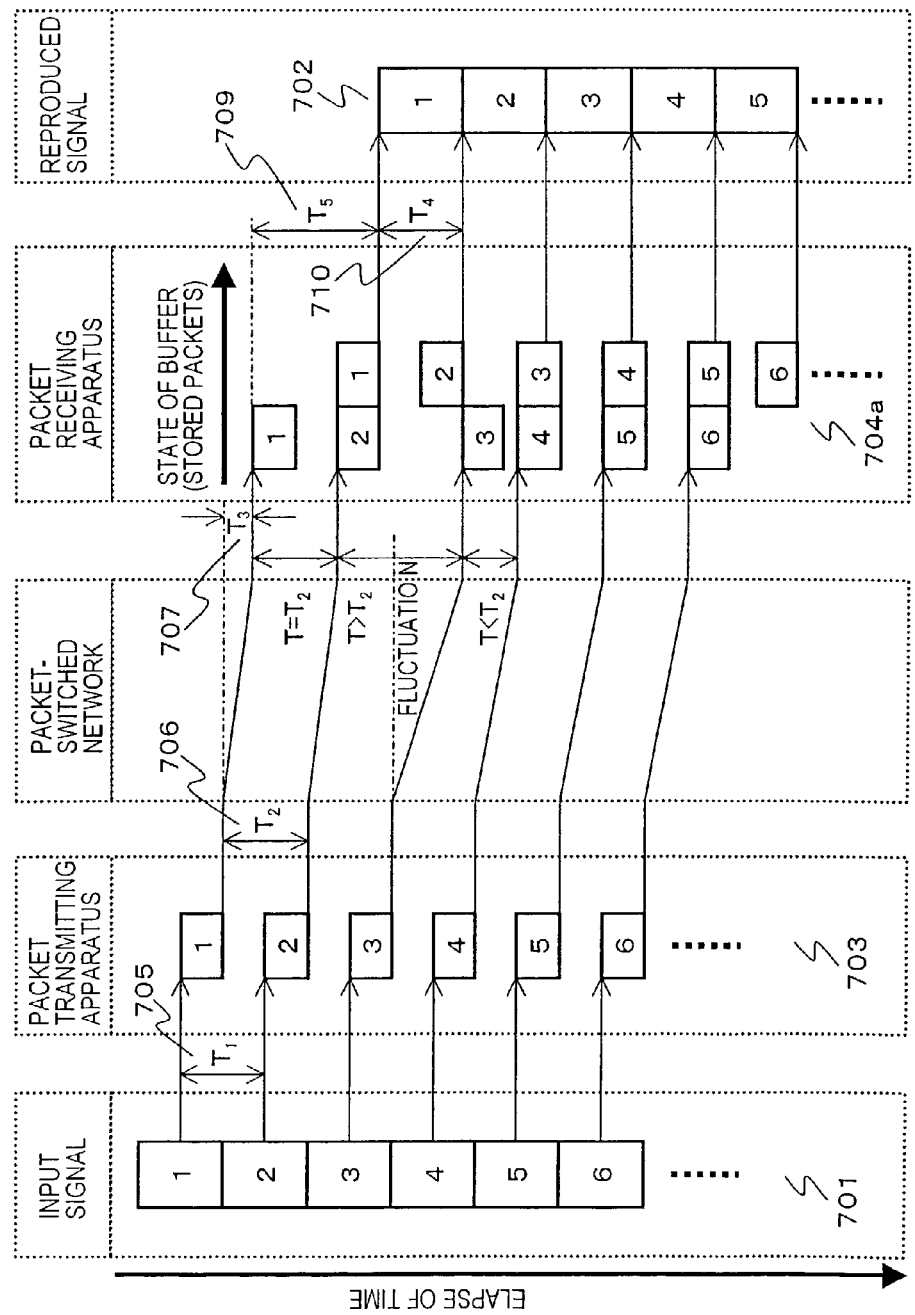
FIG. 9 is a diagram for explaining a flow of a media data signal in the case where a receiving end once stores a packet data received from a packet-switched network, and thereafter processes the packet data, in the conventional real time communication system.

On the other hand, when the buffer 34 overflows, the flow becomes as shown in FIG. 7. Namely, the monitoring unit 35a makes the decoding unit 35 skip the address of reading encoded data from the buffer 34, by the number corresponding to the above-mentioned standard data storage number (here, two). As a result, there arise a skip of the signal corresponding to the above-mentioned standard data storage number. Here, the transmission fluctuation that can be absorbed is the larger, the larger the above-mentioned standard data storage number becomes.

Hereinabove, one embodiment of the present invention has been described.

In the packet data receiving apparatus 2 of the present embodiment, the monitoring unit 35a monitors the state of the buffer 34 periodically. When the number of encoded data in the buffer 34 shows an increasing tendency from the standard data storage number (a sufficient number of encoded data for absorbing the expected transmission fluctuation), successively a predetermined number of times, then, it is judged that there is a tendency of overflow owing to a difference between the sampling period of the packet data transmitting apparatus 1 and the reproduction period of the packet data receiving apparatus 2. Thus, the decoding unit 35 is made to skip the encoded data to be read from the buffer 34 and processed this time, by at least one. Further, when the number of encoded data in the buffer 34 tends to decrease from the above-mentioned standard data storage number, successively the predetermined number of times, then, it is judged that there is a tendency of underflow owing to a difference between the above-mentioned sampling period and the above-mentioned reproduction period. Thus, the processing unit 35 is made to suspend its operation for at least one period of the above-mentioned reproduction period.

Thus, according to the present embodiment, it is possible to prevent underflow or overflow of the buffer 34 owing to a difference between the above-mentioned sampling period and the above-mentioned reproduction period. Thus, it is possible to reduce a frequency of long interruption (extending over the buffering waiting time) of a media data signal, caused by underflow or overflow of the buffer 34.

Here, in the example shown in FIGS. 4–11, the standard data storage number is assumed to be two for the sake of simplicity of description. However, in practice, the standard data storage number must be set to a larger value for absorbing transmission fluctuation expected on a packet-switched network 2. Accordingly, when there occurs underflow or overflow of the buffer 34, then, long interruption (extending over the buffering waiting time) of a media data signal is caused, and quality of real time communication is deteriorated. On this point, according to the present embodiment, it is possible to reduce a frequency of underflow and overflow of the buffer 34 in comparison with the conventional technique, and thus, quality improvement of real time communication can be expected.

The present invention is not limited to the above-described embodiment, and can be changed variously within a scope of its gist.

For example, in the above-described embodiment, the packet data receiving apparatus 2 may be implemented by hardware using an integrated logic IC such as ASIC (Application Specific Integrated Circuit) or FPGA (Field Programmable Gate Array), or by software together with a processor such as DSP (Digital Signal Processor).

Figure 3:
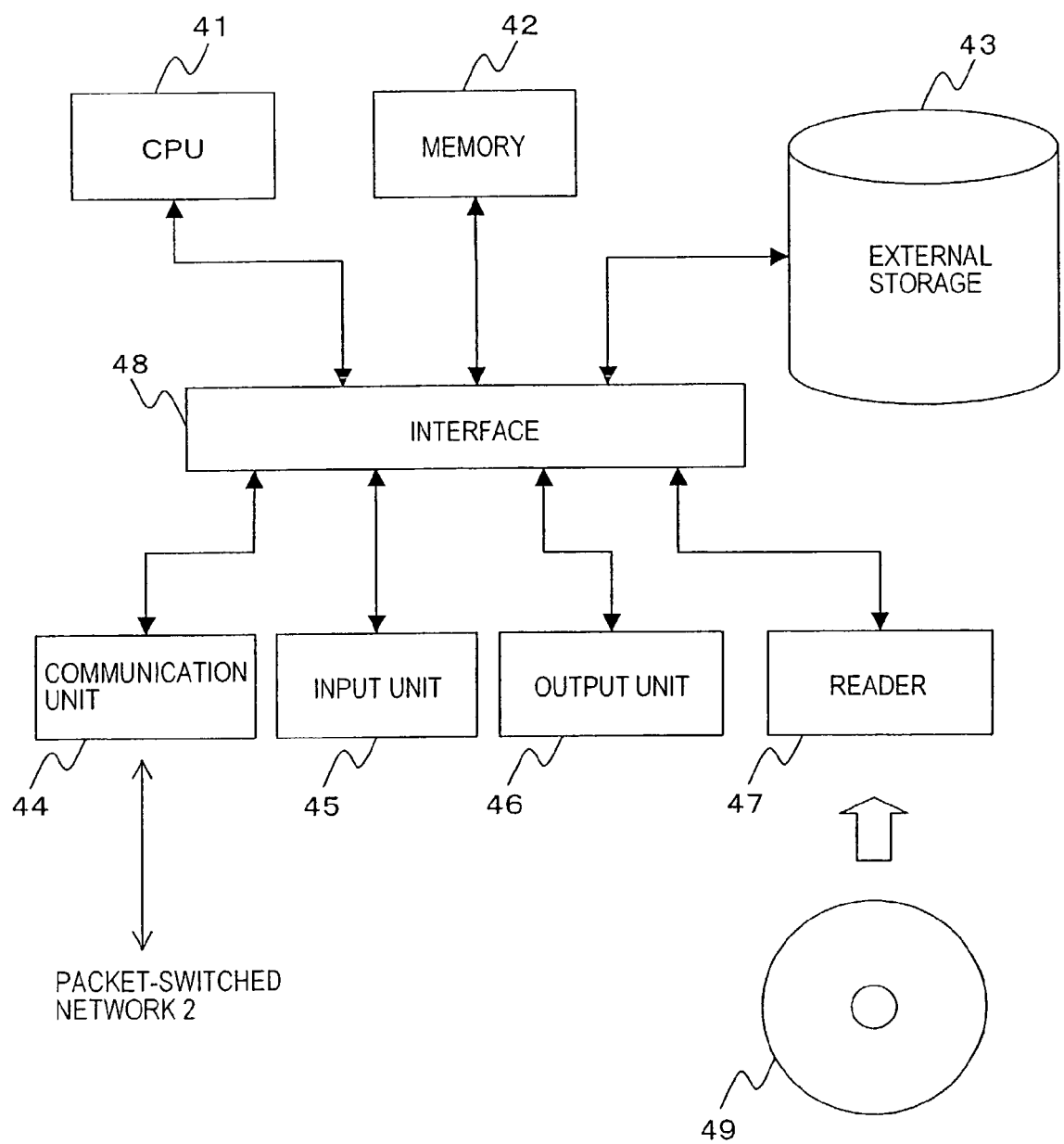
FIG. 3 is a block diagram showing a hardware configuration of the packet data receiving apparatus 3 shown in FIG. 1.

Or, the packet data receiving apparatus 2 may be implemented by an ordinary computer system as shown in FIG. 3, comprising a CPU 41, a memory 42, an external storage 43 such as a hard disk, a communication unit 44 for communicating with the packet data transmitting apparatus 1 through a packet-switched network 2, an input unit 45 such as a keyboard or mouse, an output unit 46 such as a display, a reader 47 for reading data from a storage medium 49 such as a CD-ROM or FD, and an interface for sending and receiving data between those components, where the CPU 41 executes a specific program loaded on the memory 42. Here, the specific program may be obtained from the storage medium 49 that stores the program in question through the reader 47 or from the packet-switched network 2 through the communication unit 44, and loaded directly onto the memory 42. Or, the program may be once stored into the external storage 43, and thereafter loaded onto the memory 42.

Further, the above-described embodiment has been described taking the example where the buffer 34 of the packet data receiving apparatus 2 is used ring-wise. However, the present invention is not limited to this. For example, a FIFO-type buffer memory can be used as far as reading and erasing of data can be performed at the same time in accordance with the same reproduction period.

Further, in the above-described embodiment, when the buffer 34 overflows, the monitoring unit 35a of the packet data receiving apparatus 2 makes the decoding unit 35 skip the reading address of encoded data to be processed, by the number corresponding to the standard data storage number. However, the present invention is not limited to this. As in the conventional technique described referring to FIG. 11, the buffer 34 may be cleared, and the decoding unit 35 is made to suspend its processing while the standard data storage number of encoded data are stored.

As described above, according to the present invention, it is possible in real time communication to reduce long interruption of a media data signal caused by underflow or overflow of a buffer.

What is claimed is:

1. A packet data processing apparatus for processing a packet data stream received through a packet-switched network, wherein:

said packet data processing apparatus comprises:

a network interface unit for receiving packet data constituting said packet data stream from said packet-switched network;

a buffer for temporarily storing said packets received by said network interface unit;

a processing unit for sequentially reading and processing the packet data stored in said buffer; and a monitoring unit for monitoring a state of said buffer periodically; and said monitoring unit comprises:

an underflow or overflow processing part which periodically judges whether the buffer is in a state of underflow or overflow, and if the buffer is in the state of underflow or overflow, performs a process to have an amount of data stored in the buffer to be equivalent to a predetermined amount for absorbing transmission fluctuation, and a synchronous processing part which makes said processing unit skip at least one packet data to be read and processed next by said processing unit, if a number of the packet data stored in said buffer shows a tendency of increasing from a predetermined number of packet data, successively a given number of times; and which makes said processing unit suspend operation during a period of time required for reading and processing at least one packet data, if the number of the packet data stored in said buffer shows a tendency of decreasing from the predetermined number of packet data, successively the given number of times.

2. The packet data processing apparatus according to claim 1, wherein:

said synchronous processing part of the monitoring unit periodically monitors the state of said buffer synchronously with points when said processing unit reads a packet data from said buffer; and as a result, when it has not finished to store a packet data, which comes after said predetermined number of packet data' from a packet data to be read from said buffer by said processing unit, into said buffer, then, said monitoring unit judges that the number of the packet data stored in said buffer tends to decrease from the predetermined number of data; and when it has finished to store packet data, which comes after said predetermined number of data from a packet data to be read by said processing unit from said buffer, into said buffer, then, said monitoring unit judges that the number of the packet data stored in said buffer tends to increase from the predetermined number of data.

3. The packet data processing apparatus according to claim 1, wherein:

said underflow or overflow processing part renders said processing unit to either suspend operation until packet data of said predetermined number of packet data are stored into said buffer, when said buffer underflows or skip the packet data to be read and processed next by said processing unit, by said predetermined number of packet data, when said buffer overflows.

4. The packet data processing apparatus according to claim 1, wherein:

said packet data stream represents an audio signal or a video signal; and said underflow or overflow processing part performs a process of sequentially reading out the packet data stored in said buffer in order to perform real-time reproduction of the audio signal or the video signal represented by said packet data stream received through said packet-switched network.

5. A packet data processing program for processing a packet data stream received by a computer system through a packet-switched network, wherein:

said packet data processing program is read and executed by said computer system, to implement:

a buffer for temporarily storing packet data that constitute said packet data stream received through said packet-switched network;

a processing unit for sequentially reading and processing packet data stored in said buffer; and a monitoring unit for monitoring a state of said buffer periodically; on said computer system; and said monitoring unit comprises:

an underflow or overflow processing part which periodically judges whether the buffer is in a state of underflow or overflow, and if the buffer is in the state of underflow or overflow, performs a process to have an amount of data stored in the buffer to be equivalent to a predetermined amount of data for absorbing transmission fluctuation, and a synchronous processing part which makes said processing unit skip at least one packet data to be read and processed next by said processing unit, if a number of the packet data stored in said buffer shows a tendency of increasing from a predetermined number of packet data, successively a given number of times; and which makes said processing unit suspend operation during a period of time required for reading and processing at least one packet data, if the number of the packet data stored in said buffer shows a tendency of decreasing from the predetermined number of packet data, successively the given number of times.

6. A storage medium that sores the packet data processing program according to claim 5 and is readable by a computer system.

7. A packet data processing method for processing a packet data stream received through a packet-switched network, comprising:

a storing step in which packet data constituting said packet data stream are received from said packet-switched network and stored temporarily in a buffer;

a processing step in which packet data stored in said buffer are sequentially read and processed; and a monitoring step in which a state of said buffer is monitored periodically; and said monitoring step comprises:

performing in an underflow or overflow processing part which periodically judges whether the buffer is in a state of underflow or overflow, and if the buffer is in the state of underflow or overflow, a process to have an amount of data stored in the buffer to be equivalent to a predetermined amount for absorbing transmission fluctuation, and making, by a synchronous processing part, said processing unit skip at least one packet data to be read and processed next by said processing unit, if a number of the packet data stored in said buffer shows a tendency of increasing from a predetermined number of data, successively a given number of times, and making said processing unit suspend operation during a period of time required for reading and processing at least one packet data, if the number of the packet data stored in said buffer shows a tendency of decreasing from the predetermined number of packet data, successively the given number of times.

* * * * *